(No Model.)
N. STEELE.
WIRE FENCE.
No. 590,917. Patented Sept. 28, 1897.
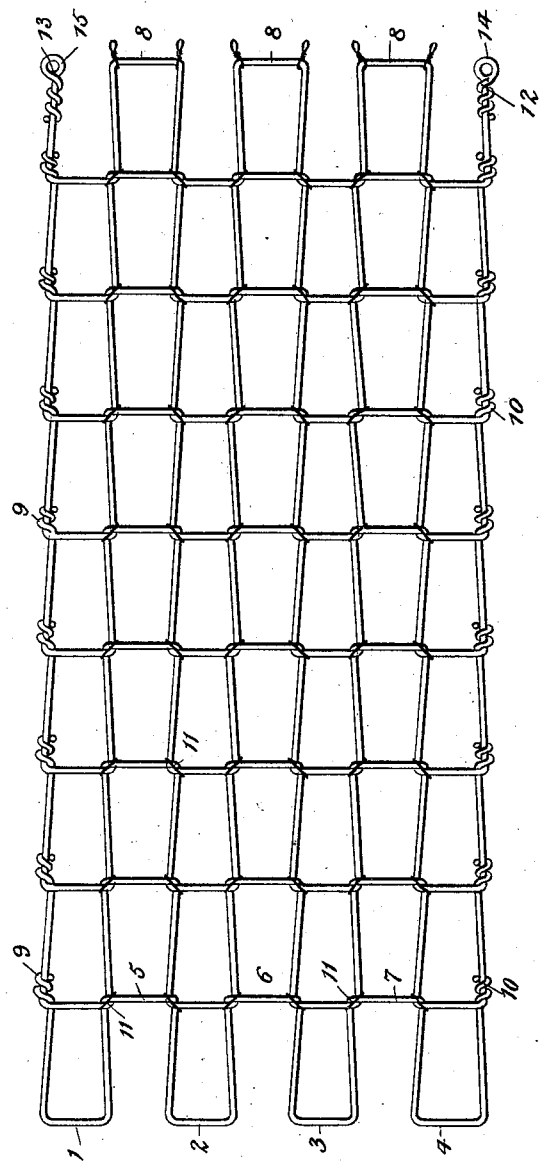
WITNESSES
John A. Rennie
J. G. Tabler.
INVENTOR.
Nathan Steele,
by John Wedderburn
Attorney

UNITED STATES PATENT OFFICE.

NATHAN STEELE, OF COLUMBUS, OHIO.

WIRE FENCE.

SPECIFICATION forming part of Letters Patent No. 590,917, dated September 28, 1897.

Application filed November 17, 1896. Serial No. 612,464. (No model.)

*To all whom it may concern:*

Be it known that I, NATHAN STEELE, a citizen of the United States, residing at Columbus, in the county of Franklin and State of Ohio, have invented certain new and useful Improvements in Wire Fences; and I do hereby declare the following to be a full, clear, and exact description of the invention, such as will enable others skilled in the art to which it appertains to make and use the same.

My invention relates to wire fences.

My object is to provide an extremely simple and cheap wire fence which will be very strong and can be easily constructed and repaired whenever desirable.

Having this object in view, my invention consists of a wire fence of novel and peculiar construction, as will appear more fully hereinafter.

The accompanying drawing represents a front elevation of my improved fence.

There are employed a series of wires of equal length, each of which is bent into a series of links or loops, and said links are hooked together in a peculiar manner.

The numerals 1, 2, 3, and 4 designate a series of links or loops on one of the wires, while 5, 6, and 7 represent additional links or loops which are formed by the bending of the aforesaid loops, but extend in an opposite direction thereto. It will be observed that the loop or link is broadest at its cross-piece 8, and its arms converge.

The numerals 9 and 10 designate the ends of the wire, which are wrapped around the pieces of the upper and lower links of the adjacent wire in the manner shown.

The numeral 11 designates a series of individual pieces of wire which fasten the links together where they are hooked over each other. The extreme right-hand wire, or the one initially placed in position, has its ends 12 and 13, respectively, bent or twisted around the members of the upper and lower links, thereby forming eyes 14 and 15, which may be stapled to the fence-post. Furthermore, the cross-pieces 8 and the links of this wire can also be stapled through the fence-post.

The manner of forming the fence is at once obvious to those skilled in the art to which my invention appertains. It will be observed that after the first wire has been stapled to the fence-post, as before described, the fence is built up by interlocking the links or loops of the succeeding wires to each other. The separate wires that form the fence need no machinery to bend them into loops, as this can be done by hand quickly and easily. Hence my fence is rendered very cheap in construction and can be readily built by any one.

There are many slight and immaterial changes which might be resorted to in carrying out my invention, and hence it is to be understood that I do not limit myself to the precise construction herein shown and described, but consider that I am entitled to all such variations as properly come within the spirit and scope of the invention.

Having thus described my invention, what I claim as new, and desire to secure by Letters Patent, is—

1. The herein-described wire fence, which comprises the combination of a series of wires, each being bent into a series of loops or links, the links of the succeeding wires being passed through the links of the preceding ones, and additional fastening-wires bound around the locked portions of the respective sets of links.

2. The herein-described wire fence, which comprises the combination of a series of individual wires, each of which is bent into a series of links, the links of the succeeding wire being passed through those of the preceding wire so that said links are interlocked, and the ends of the individual wires being twisted around the links of the preceding wires, and separate binding or fastening wires which are wrapped around the interlocked portions of the links.

In testimony whereof I have signed this specification in the presence of two subscribing witnesses.

NATHAN STEELE.

Witnesses:
D. J. O'GRADY,
FRANK C. HUBBARD.